US011656782B2

(12) United States Patent
Kronrod et al.

(10) Patent No.: US 11,656,782 B2
(45) Date of Patent: May 23, 2023

(54) GLOBAL DEADLINE DRIVEN LOCAL SYNCHRONOUS REPLICATION I/O HANDLING AND RECOVER

(71) Applicant: Dell Products L.P., Round Rock, TX (US)

(72) Inventors: Svetlana Kronrod, Concord, MA (US); Xiangping Chen, Sherborn, MA (US)

(73) Assignee: Dell Products L.P., Round Rock, TX (US)

( * ) Notice: Subject to any disclaimer, the term of this patent is extended or adjusted under 35 U.S.C. 154(b) by 113 days.

(21) Appl. No.: 16/668,661

(22) Filed: Oct. 30, 2019

(65) Prior Publication Data

US 2021/0132806 A1 May 6, 2021

(51) Int. Cl.
*G06F 3/06* (2006.01)

(52) U.S. Cl.
CPC ............ *G06F 3/065* (2013.01); *G06F 3/0604* (2013.01); *G06F 3/067* (2013.01)

(58) Field of Classification Search
CPC ........ G06F 3/065; G06F 3/0604; G06F 3/067; G06F 3/0619; G06F 3/0647; G06F 3/0659
USPC ......................................................... 711/162
See application file for complete search history.

(56) References Cited

U.S. PATENT DOCUMENTS

| | | | |
|---|---|---|---|
| 7,386,692 B1 * | 6/2008 | Moore | G06F 13/387 711/158 |
| 7,475,124 B2 | 1/2009 | Jiang | |
| 8,327,103 B1 | 12/2012 | Can et al. | |
| 8,380,928 B1 | 2/2013 | Chen et al. | |
| 8,429,346 B1 | 4/2013 | Chen et al. | |
| 8,515,911 B1 | 8/2013 | Zhou et al. | |
| 8,539,148 B1 | 9/2013 | Chen et al. | |
| 8,566,483 B1 | 10/2013 | Chen et al. | |
| 8,583,607 B1 | 11/2013 | Chen et al. | |
| 8,683,153 B1 | 3/2014 | Long et al. | |
| 8,712,976 B1 | 4/2014 | Chen et al. | |
| 8,775,388 B1 | 7/2014 | Chen et al. | |
| 8,782,324 B1 | 7/2014 | Chen et al. | |
| 8,799,601 B1 | 8/2014 | Chen et al. | |
| 8,909,887 B1 | 12/2014 | Armangau et al. | |

(Continued)

OTHER PUBLICATIONS

U.S. Appl. No. 15/499,943, filed Apr. 28, 2017, Kucherov et al.

(Continued)

*Primary Examiner* — Gautam Sain
(74) *Attorney, Agent, or Firm* — Daly, Crowley Mofford & Durkee, LLP

(57) ABSTRACT

A method is provided for use in a storage system, the method comprising: receiving an I/O request at an R-node; generating a deadline for the I/O request; generating a C-node command based on the I/O request; transmitting the C-node command and the I/O request to a C-node; calculating, by the C-node, a first remaining time based on the deadline; detecting, by the C-node, whether the first remaining time meets a first threshold; when the first remaining time meets the first threshold, executing the I/O request and transmitting, from the C-node to the R-node, synchronous replication request that is associated with the C-node command; and when the first remaining time does not meet the first threshold, causing the storage system to stop performing synchronous replication and executing the C-node command.

14 Claims, 8 Drawing Sheets

(56) References Cited

U.S. PATENT DOCUMENTS

| | | |
|---|---|---|
| 8,930,746 B1 | 1/2015 | Chen et al. |
| 8,954,699 B1 | 2/2015 | Chen et al. |
| 8,977,812 B1 | 3/2015 | Chen et al. |
| 9,152,336 B1 | 10/2015 | Chen et al. |
| 9,304,889 B1* | 4/2016 | Chen ................. G06F 11/3433 |
| 9,355,112 B1 | 5/2016 | Armangau et al. |
| 9,384,206 B1 | 7/2016 | Bono et al. |
| 9,395,937 B1 | 7/2016 | Si et al. |
| 9,449,011 B1 | 9/2016 | Chen et al. |
| 9,459,809 B1 | 10/2016 | Chen et al. |
| 9,460,102 B1 | 10/2016 | Bono et al. |
| 9,477,431 B1 | 10/2016 | Chen et al. |
| 9,513,814 B1 | 12/2016 | Can et al. |
| 9,529,545 B1 | 12/2016 | Bono et al. |
| 9,542,125 B1 | 1/2017 | Chen |
| 9,594,514 B1 | 3/2017 | Bono et al. |
| 9,626,116 B1* | 4/2017 | Martin ................ G06F 11/3034 |
| 9,684,593 B1 | 6/2017 | Chen et al. |
| 9,710,187 B1 | 7/2017 | Si et al. |
| 9,811,288 B1 | 11/2017 | Chen et al. |
| 9,817,766 B1 | 11/2017 | Si et al. |
| 10,037,369 B1 | 7/2018 | Bono et al. |
| 10,082,959 B1 | 9/2018 | Chen et al. |
| 10,095,428 B1 | 10/2018 | Meiri et al. |
| 10,152,381 B1 | 12/2018 | Shvaiger et al. |
| 10,176,046 B1 | 1/2019 | Hu et al. |
| 10,235,066 B1 | 3/2019 | Chen et al. |
| 10,248,623 B1 | 4/2019 | Chen et al. |
| 10,261,853 B1 | 4/2019 | Chen et al. |
| 10,310,951 B1 | 6/2019 | Chen et al. |
| 10,324,640 B1 | 6/2019 | Chen et al. |
| 10,338,851 B1 | 7/2019 | Kronrod et al. |
| 10,353,616 B1 | 7/2019 | Tao et al. |
| 10,359,968 B1 | 7/2019 | Chen et al. |
| 10,374,792 B1 | 8/2019 | Meiri et al. |
| 10,394,485 B1 | 8/2019 | Chen et al. |
| 10,402,283 B1 | 9/2019 | Chen et al. |
| 10,409,493 B1 | 9/2019 | Kucherov et al. |
| 10,459,632 B1 | 10/2019 | Chen et al. |
| 10,459,883 B1 | 10/2019 | Meiri et al. |
| 10,496,489 B1 | 12/2019 | Chen et al. |
| 10,496,668 B1 | 12/2019 | Meiri et al. |
| 10,496,672 B2 | 12/2019 | Meiri et al. |
| 10,565,058 B1 | 2/2020 | Meiri et al. |
| 2004/0193821 A1* | 9/2004 | Ruhovets ................ G11C 5/04 711/167 |
| 2012/0290707 A1* | 11/2012 | Ennis ...................... H04L 43/10 709/224 |
| 2014/0047263 A1* | 2/2014 | Coatney .................. G06F 11/20 714/4.11 |
| 2015/0234860 A1* | 8/2015 | Sakaguchi .......... G06F 11/3419 707/622 |
| 2019/0045028 A1* | 2/2019 | Wysocki ............. H04L 43/0852 |
| 2019/0294334 A1* | 9/2019 | Kucherov ............. G06F 3/0608 |

OTHER PUBLICATIONS

U.S. Appl. No. 15/499,949, filed Apr. 28, 2017, Chen et al.
U.S. Appl. No. 15/499,951, filed Apr. 28, 2017, Chen et al.
U.S. Appl. No. 15/656,168, filed Jul. 21, 2017, Hu et al.
U.S. Appl. No. 15/656,170, filed Jul. 21, 2017, Chen et al.
U.S. Appl. No. 15/797,324, filed Oct. 30, 2017, Chen et al.
U.S. Appl. No. 16/042,363, filed Jul. 23, 2018, Chen et al.
U.S. Appl. No. 16/038,543, filed Jul. 18, 2018, Chen et al.
U.S. Appl. No. 16/048,767, filed Jul. 30, 2018, Chen et al.
U.S. Appl. No. 16/169,202, filed Oct. 24, 2018, Chen et al.
U.S. Appl. No. 16/177,782, filed Nov. 1, 2018, Hu et al.
U.S. Appl. No. 16/167,858, filed Oct. 23, 2018, Chen et al.
U.S. Appl. No. 16/175,979, filed Oct. 31, 2018, Hu et al.
U.S. Appl. No. 16/157,528, filed Oct. 11, 2018, Chen et al.
U.S. Appl. No. 16/162,786, filed Oct. 17, 2018, Hu et al.
U.S. Appl. No. 16/164,005, filed Oct. 18, 2018, Chen et al.
U.S. Appl. No. 16/264,825, filed Feb. 1, 2019, Chen et al.
U.S. Appl. No. 16/254,899, filed Jan. 23, 2019, Chen et al.
U.S. Appl. No. 16/254,897, filed Jan. 23, 2019, Chen et al.
U.S. Appl. No. 16/264,982, filed Feb. 1, 2019, Chen et al.
U.S. Appl. No. 16/263,414, filed Jan. 31, 2019, Meiri et al.
U.S. Appl. No. 16/375,001, filed Apr. 4, 2019, Chen et al.
U.S. Appl. No. 16/380,087, filed Apr. 10, 2019, Kronrod et al.
U.S. Appl. No. 16/592,271, filed Oct. 3, 2019, Chen et al.
U.S. Appl. No. 16/592,328, filed Oct. 3, 2019, Barabash et al.
U.S. Appl. No. 16/667,453, filed Oct. 29, 2019, Chen et al.
U.S. Appl. No. 16/668,661, filed Oct. 30, 2019, Kronrod et al.
U.S. Appl. No. 16/743,274, filed Jan. 15, 2020, Chen et al.
U.S. Appl. No. 16/747,169, filed Jan. 20, 2020, Chen et al.
U.S. Appl. No. 16/786,422, filed Feb. 10, 2020, Kronrod et al.
U.S. Appl. No. 16/788,461, filed Feb. 12, 2020, Chen et al.
U.S. Appl. No. 16/773,303, filed Jan. 27, 2020, Hu et al.
U.S. Appl. No. 16/511,676, filed Jul. 15, 2019, Chen et al.

\* cited by examiner

GLOBAL DEADLINE DRIVEN LOCAL SYNCHRONOUS REPLICATION I/O HANDLING AND RECOVER

BACKGROUND

A distributed storage system may include a plurality of storage devices (e.g,, storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method is provided for use in a storage system, the method comprising: receiving an I/O request at an R-node; generating a deadline for the I/O request; generating a C-node command based on the I/O request; transmitting the C-node command and the I/O request to a C-node; calculating, by the C-node, a first remaining time based on the deadline; detecting, by the C-node, whether the first remaining time meets a first threshold; when the first remaining time meets the first threshold, executing the I/O request and transmitting, from the C-node to the R-node, synchronous replication request that is associated with the C-node command; and when the first remaining time does not meet the first threshold, causing the storage system to stop performing synchronous replication and executing the C-node command.

According to aspects of the disclosure, a device is provided, comprising: a memory; and at least one processor operatively coupled to the memory, the at least one processor being configured to execute a C-node and an R-node of a storage system: wherein the R-node is configured to perform the operations of receiving an. I/O request, generate a deadline for the I/O request, generating a C-node command based on the I/O request, and transmitting the C-node command and the I/O request to the C-node; wherein the C-node is configured to perform the operations of: (i) calculating a first remaining time based on the deadline; (i) detecting whether the first remaining time meets a first threshold, (ii) in response to detecting that the first remaining time meets the first threshold, executing the I/O request and transmitting, to the R-node, a synchronous replication request that is associated with the C-node command, and (iv) in response to detecting that the first remaining time does not meet the first threshold, causing the storage system to stop performing synchronous replication and executing the C-node command.

According to aspects of the disclosure, a non-transitory computer-readable storage medium storing processor-executable instructions, which when executed by one or more processors in a storage system, cause the one or more processors to perform the operations of receiving an I/O request at an R-node; generating a deadline for the I/O request; generating a C-node command based on the I/O request; transmitting the C-node command and the I/O request to a C-node; calculating, by the C-node, a first remaining time based on the deadline; detecting, by the C-node, whether the first remaining time meets a first threshold; when the first remaining time meets the first threshold, executing the I/O request and transmitting, from the C-node to the R-node, a synchronous replication request that is associated with the C-node command; and when the first remaining time does not meet the first threshold, causing the storage system to stop performing synchronous replication and executing the C-node command.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1:
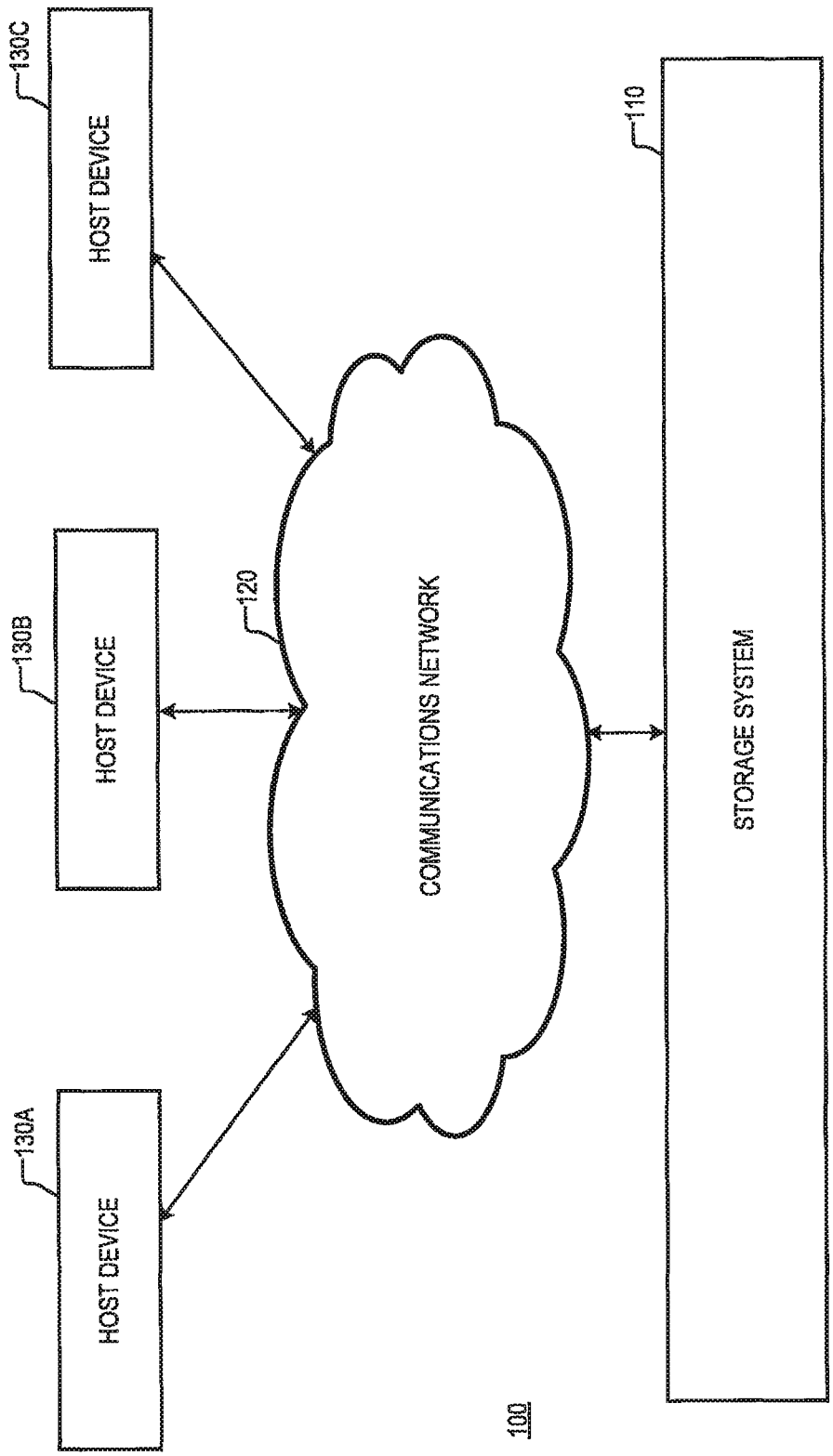
FIG. 1 is a diagram of an example of a system, according to aspects of the disclosure.

FIG. 1 is a diagram of an example of a system 100, according to aspects of the disclosure. The system 100 may include a storage system 110 that is coupled to one or more host devices 130 via a communications network 120. The storage system 110 may include a content-addressable storage system that is configured to retrieve and store data on one or more storage devices in response to I/O requests that are transmitted by the host devices 130. The communications network 120 may include a local area network (LAN), a wide area network (WAN), the Internet, and/or any or suitable type of communications network. Each of the host devices 130 may include a desktop computer, a laptop computer, a smartphone, a digital media player, and/or any other suitable type of electronic device.

Figure 2:
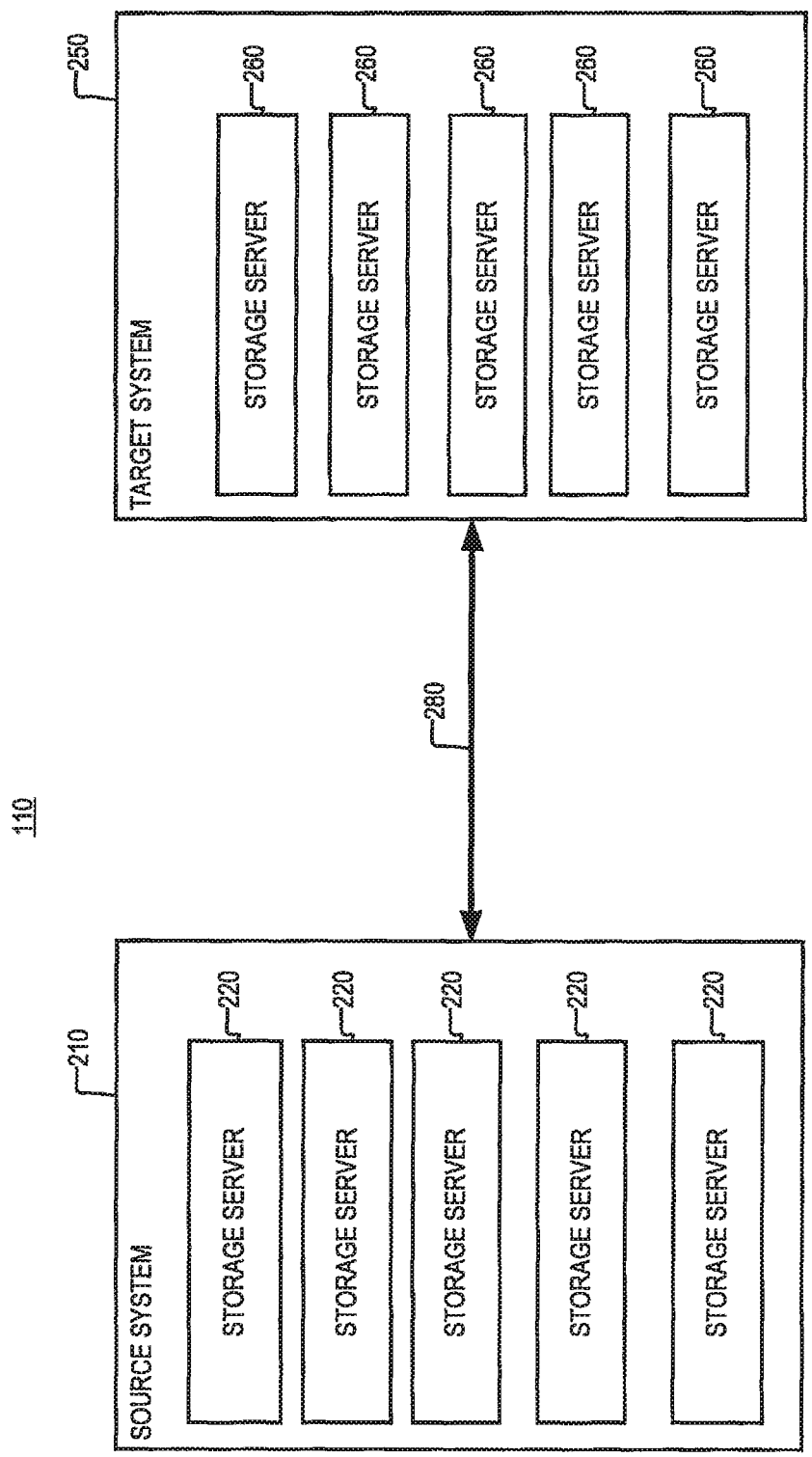
FIG. 2 is a diagram of an example of a storage system, according to aspects of the disclosure.

FIG. 2 is a diagram illustrating the storage system 110 in further detail, according to aspects of the disclosure. As illustrated, the storage system 110 may include a source system 210 that is coupled to a target system 250 via a network. 280. The network 280 may include an InfiniBand network, a TCP/IP network, and/or any other suitable type of communications network. The source system 210 may include a plurality of storage servers 220. In operation, each of the storage servers 220 may be configured to execute I/O requests that are received at the storage system 110. The I/O requests may include read requests, write requests, and/or any other suitable type of I/O request. The target system 250 may include a plurality of storage servers 260, as shown. In some implementations, each of the storage servers 260 may be configured to execute data replication requests that are provided to the storage server 260 by any of the storage servers 220.

The storage system 110 may be configured to perform synchronous and asynchronous data replication. Performing asynchronous replication by the storage system 110 (or source system 210) may include transmitting replication data from any of the storage servers 220 to any of the storage servers 260. The asynchronous snapshot data may be transmitted at fixed intervals, which are specified by a recovery point objective (RPO) of the storage system 110. The asynchronous replication data may be generated based on one or more I/O requests that are received at the storage system 110. The I/O requests may include a request to delete data stored in the storage system 110, a request to write data to the storage system 110, and/or any other suitable type I/O request. In this regard, in some implementations, the asynchronous replication data may include a payload of the I/O requests (e.g., data that is desired to be stored in the storage system 110) and/or data that is generated based on the payload.

Performing synchronous replication by the storage system 110 (or source system 210) may include transmitting replication data from any of the storage servers 220 to any of the storage servers 260. The replication data may be associated with an I/O request that is received at the storage system 110. The I/O request may include a request to delete data stored in the storage system 110, a request to write data to the storage system 110 and/or any other suitable type of I/O request, In this regard, the synchronous replication data may be generated based on data that is associated with the I/O request. In this regard, in some implementations, the synchronous replication data may include a payload of the I/O requests (e.g., data that is desired to be stored in the storage system 110) and/or data that is generated based on the payload.

It will be understood that the present disclosure is not limited to any specific method for synchronous and/or asynchronous replication. Examples concerning the generation of replication data are discussed in further detail in U.S. Pat. No. 10,310,951, titled Storage System Asynchronous Data Replication Cycle Trigger with Empty Cycle Detection, and U.S. Pat. No. 10,324,640, titled Storage System with Consistent Initiation of Data Replication Across Multiple Distributed Processing Modules, both of which are herein incorporated by reference in their entirety.

As is discussed further below, when an I/O request is received at the storage system I/O, that request may be decomposed into sub-commands (e.g, C-node commands, D-node commands, etc.), which are then executed by different nodes of the storage system 110. The I/O request is completed only when all sub-commands associated with the I/O request are executed successfully. More specifically, as is further discussed below with respect to FIG. 4, the source system 210 may include a plurality of R-nodes (e.g., routing nodes), C-nodes (e.g , control nodes), and D-nodes (e.g., data nodes). In operation, when an I/O request is received at an R-nods;, that request may be decomposed into one or more C-node commands. Next, the C-node commands may be transmitted to respective C-nodes. Next, each of the C-node commands may be decomposed into one or more D-node commands by the C-nodes. Next, the D-node commands may be transmitted to respective D-nodes. And finally, each of the D-node commands may be executed by one of the D-nodes. Executing any of the D-node commands may include reading or writing data from corresponding storage devices, such as the storage device(s) 340, which are discussed further below with respect to FIGS. 3-4. As used throughout the disclosure, the term "node" may refer to a thread (or process) that is executed on a computing device (e.g., a storage server) and/or to the computing device itself.

In some implementations, the type of replication performed by the storage system 110 may affect the latency of the storage system 110. Specifically, when I/O requests are replicated by using synchronous replication, the completion of those I/O requests is acknowledged (e.g., to the host devices 130) only when I/O request handling is completed successfully on both the source system 210 and the target system 250. In other words, the speed at which synchronous replication is carried affects the speed at which the completion of I/O requests is acknowledged by the storage system 110, which in turn impacts the overall latency of the storage system 110. In general, to maintain a desirable performance, the storage system 110 may be required to satisfy two criteria: (i) each I/O request that is received at the storage system 110, from the host devices 130, may be required to be completed within a specified timeout window, and (ii) the execution of failed sub-commands associated with the I/O request has to be retried by nodes in the storage system 110 within the same time window in order to minimize I/O failures to the host devices 130.

To maintain a desirable performance, some conventional storage systems may use telescoping watchdog settings, in which each node executing sub-commands is provided with a different timeout period in which it is required to complete the sub-commands. For example, an R-node executing an I/O request may be given 14 seconds to finish all work associated with the I/O request; each of the C-nodes executing the I/O request may be given 12 seconds to finish all work associated with the I/O request (or a particular C-node command); and each of the D-nodes executing the I/O request may be given 10 seconds to finish all work associated with the I/O request (or a particular D-node command). In other words, when "telescopic watchdog settings" are used, a separate timeout period is defined at each node executing the request Telescoping watchdog settings may work well when there are not many nodes involved in the servicing of an I/O request, and the data flow from node to node is straightforward. When synchronous replication is performed by the storage system 110, telescoping watchdog settings may be difficult to use effectively, More particularly, when an I/O request is replicated by using synchronous replication, additional transitions between R/C/D nodes may be required to execute the I/O request (e.g., a D-node may generate a replication request for execution by an R-node, etc.). Furthermore, synchronous replication latency also depends on the condition of the network that is used to transfer replication data from a source system to a target system. The increased complexity of the data flow, and the influence of external factors (such as network conditions), make it difficult to determine watchdog timer settings for each node in a data path that would guarantee a consistent performance.

The present disclosure provides a method for controlling the latency of I/O requests, which does not depend on the assignment of timeout periods to individual nodes. The method may be executed while the storage system 110 is in a first state in which it performs synchronous replication. In one implementation of the method, when an I/O request is received at the storage system 110, a deadline is assigned to the I/O request. This deadline is subsequently embedded in each sub-command that is generated based on the I/O request and carried to individual nodes in the storage system 110 along with the sub-commands. When any sub-command associated with the I/O request is received at a node in the source system 210, the node may calculate a remaining time based on the deadline and execute the sub-command only if there is sufficient time remaining to execute the sub-command. If there is not enough time to execute the sub-command, the node may "trip" (e.g., "suspend") synchronous replication to avoid host I/O timeout. More particularly, in some implementations, if there is not enough time to execute the sub-command, the node may transition the storage system from a first state to a second state in which the storage system performs asynchronous replication. Additionally or alternatively, in some implementations, the node may cause the storage system 110 to stop performing synchronous replication when it does not have enough time to execute the sub-command, in which case the storage system 110 may continue to complete I/O request(s) locally on the source system 210 and acknowledge the completion of the I/O request(s) to the host devices 130 before any replication of the I/O requests(s) on the target system 250 has taken place.

When any sub-command associated with the I/O request is received at a node in the target system 250, the node may calculate a remaining time based on the deadline and a round trip time (RTT) of the network that is used to carry the sub-command from the source system 210 to the target system 250. Afterwards, the node may execute the sub-command only if there is enough time to execute the sub-command. By using the network RTT as a basis for calculating the remaining time, the node effectively takes into consideration factors that are external to the node and/or target system 250 when determining whether to execute the sub-command. In some implementations, when there is not enough time to execute the sub-command, the node (in the target system 250) may decline the sub-command.

Figure 3:
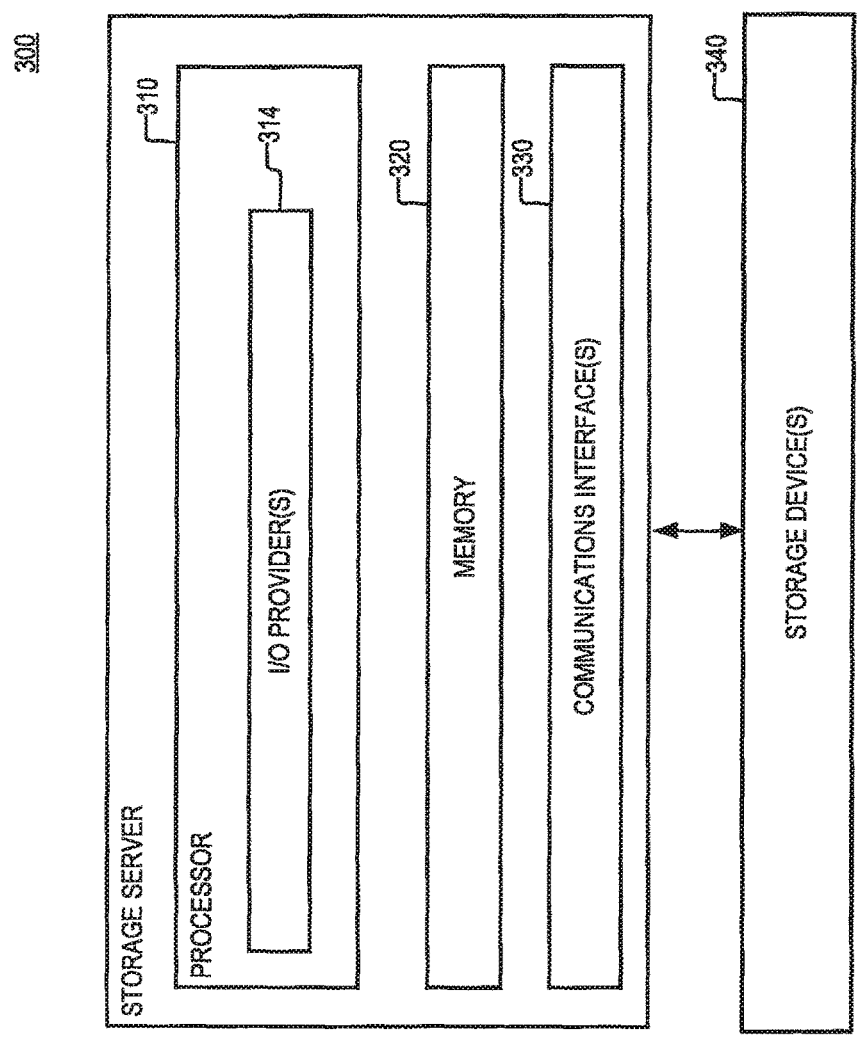
FIG. 3 is a diagram of an example of a storage server, according to aspects of the disclosure.

FIG. 3 is a diagram of an example of a storage server 300 that is coupled to one or more storage device(s) 340, according to aspects of the disclosure. The storage server 300 may be the same or similar to any of the storage server 220, which are discussed above with respect to FIG. 3. Additionally or alternatively, in some implementations, the storage server 300 may be the same or similar to any of the storage servers 260, which are discussed above with respect to FIG. 2.

As illustrated, the storage server 300 may include a processor 310, a memory 320, a communications interface(s) 330. The processor 310 may include any of one or more general-purpose processors (e.g., x86 processors, RISC processors, ARM-based processors, etc.), one or more Field Programmable Gate Arrays (FPGAs), one or more application specific circuits (ASICs), and/or any other suitable type of processing circuitry. The memory 320 may include any suitable type of volatile and/or non-volatile memory. In some implementations, the memory 320 may include one or more of a random-access memory (RAM), a dynamic random memory (DRAM), a flash memory, a hard drive (HD), a solid-state drive (SSD), a network accessible storage (NAS), and or any other suitable type of memory device. The communications interface(s) 330 may include any suitable type of communications interface, such as one or more Ethernet adapters, one or more Wi-Fi adapters (e.g., 802.1414 adapters), and one or more Long-Term Evolution (LTE) adapters, for example.

The storage device(s) 340 may include one or more of a RAID array, solid state drives(SSDs), hard drives (HDs), non-volatile random access memory (nvRAM devices, etc. Although in the example of FIG. 3, the storage device(s) 340 are depicted as separate from the storage server 300, it will be understood that in some implementations the storage device(s) 340 may be integral with the storage server 300. Stated succinctly, the present disclosure is not limited to any specific implementation of the storage device(s) 340.

According to the present example, the processor 310 may be configured to execute at least I/O provider(s) 314. The I/O provider(s) 314 may include one or more processes for executing incoming I/O requests (e.g., write requests). Although in the present example, the I/O provider 314 is implemented in software, alternative implementations are possible in which the I/O provider 314 is implemented in hardware or as a combination of hardware and software. Stated succinctly, the present disclosure is not limited to any specific implementation of the I/O provider. As used throughout the disclosure, the term "I/O provider" may refer to any process (or thread) which, alone or in combination with other processes (or threads), is configured to execute I/O requests that are received at the storage system 110.

Figure 4:
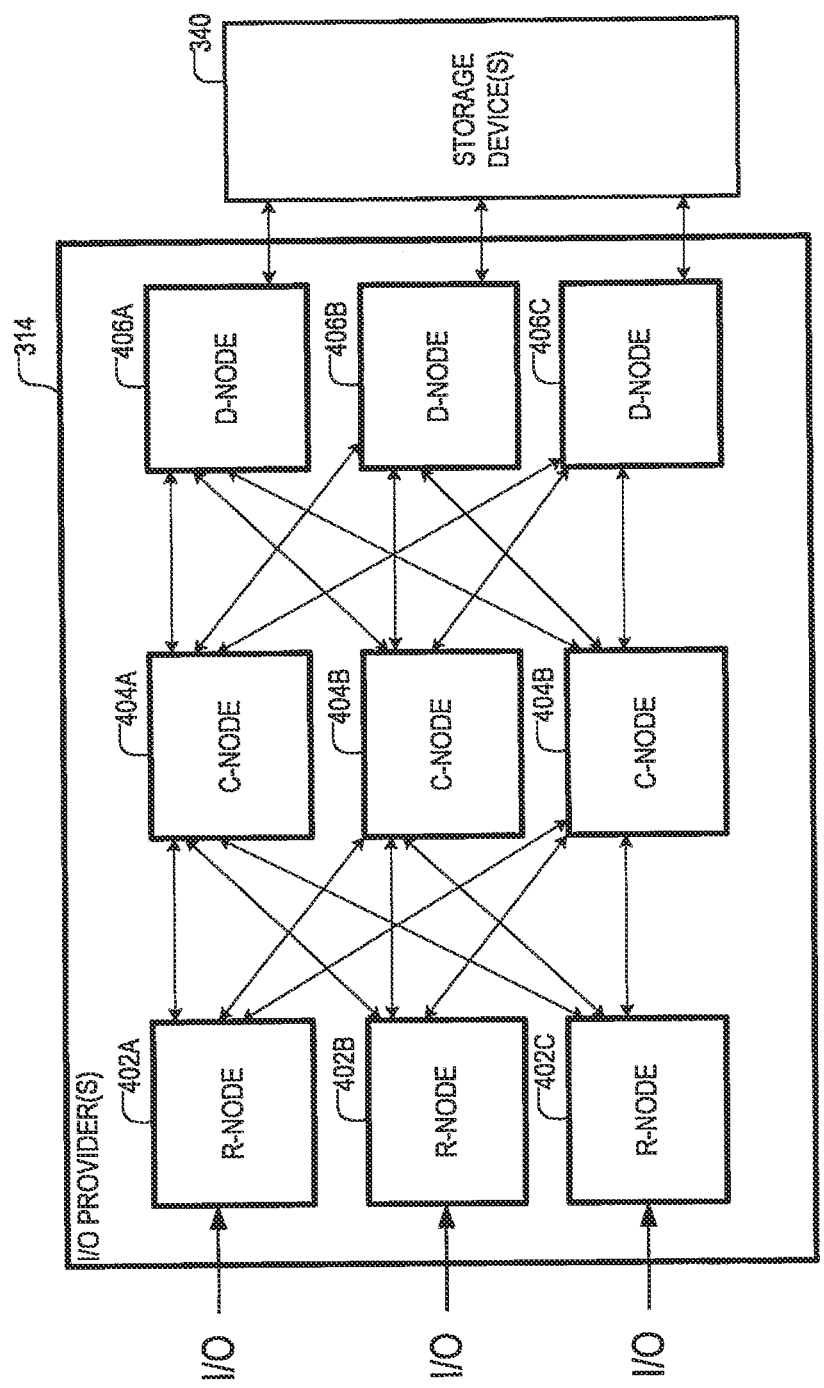
FIG. 4 is a diagram of an example of an I/O provider, according to aspects of the disclosure.

FIG. 4 is a diagram illustrating an example of one implementation of the I/O provider 314. According to the present example, the I/O provider 314 includes I/O providers 402, 404, and 406, which are herein referred to as routing nodes (R-nodes), control nodes (C-nodes), and data nodes (D-nodes) respectively. The R-nodes, the C-nodes, and the D-nodes are connected to one another in a mesh network. According to the present example, the R-nodes, the C-nodes, and the D-nodes are part of the same I/O provider, and as such, they are executed on the same storage server, However, it will be understood that alternative implementations are possible in which at least some of the R-nodes, the C-nodes, and the D-nodes are executed on different storage servers and/or are part of different I/O providers.

The R-nodes 402 may be configured to terminate I/O requests received at the storage system 110 and route them to appropriate C-nodes 404 and D-nodes 406 for further execution. In doing so, the R-nodes 402 may distribute a workload over multiple C-nodes 404 and D-nodes 406. In some implementations, any of the R-nodes 402 may be configured to write I/O requests (e.g., SCSI I/O requests) to selected ones of the C-nodes 404 for further processing.

The C-nodes 404 may be configured to control the execution of C-node commands supplied by the R-nodes 402. The C-node commands may be used to implement read requests, write requests, and/or any other suitable type of I/O request. In addition, each of the C-nodes 404 may maintain and manage key metadata elements. Each of the C-nodes 404 may be configured to receive C-node commands from the R-nodes and communicate with the D-nodes 406 to execute the commands.

The D-nodes 406 may be configured to control the execution of D-node commands supplied by the C-nodes 404 by reading and/or writing data to the storage device(s) 340. Each of the D-nodes 406 may be configured to map hash digests received from the C-nodes (in respective D-node commands) to different physical locations in the storage device(s) 340. In some implementations, the mapping may be performed by using a hash-to-physical address (H2P) structure (not shown) that is stored in the memory of any of the D-nodes 406.

In operation, any of the R-nodes 402 may receive an I/O request that spans a range of logical data addresses (LDAs) from a multipath agent. The request may include a block of data and an opcode identifying an action that is required to be performed. In response to the request, the R-node 402 may identify a plurality of C-nodes 404. Afterwards, the R-node 402 may decompose the I/O request into a plurality of C-node commands and forward the C-node commands to the identified C-nodes 404 for further processing.

In operation, any of the C-nodes 404 may receive a C-node command that is generated by one of the R-nodes 402. The C-node command may include a data payload and an opcode identifying an action that is required to be performed. Upon receiving the C-node command, the C-node 404 may generate one or more D-node commands and supply the generated D-node commands to corresponding D-nodes 406 for further processing.

In operation, any of the U-nodes 406 may receive a D-node command that is generated by one of the C-nodes 404. Next, the D-node 406 may identify a physical address in the storage devices(s) 340 that corresponds to a hash digest that is contained in the D-node command. Afterwards, the D-node 406 may store the payload of the D-node command (i.e., a page of data contained in the D-node command) at the identified physical address.

When the I/O provider 314 is executed in the source system 210, any of the C-nodes 404 may also be responsible for performing synchronous replication. In such implementations, when a C-node command is received at a C-node 404, the C-node 404 may generate a replication request associated with the C-node command and forward the replication request to one of the R-nodes 402. The R-node 402 may forward the replication request to the target system 250. Executing the synchronous replication request at the target system 250 may result in data associated with the C-node command being successfully replicated at the target system 250.

Figure 5A:
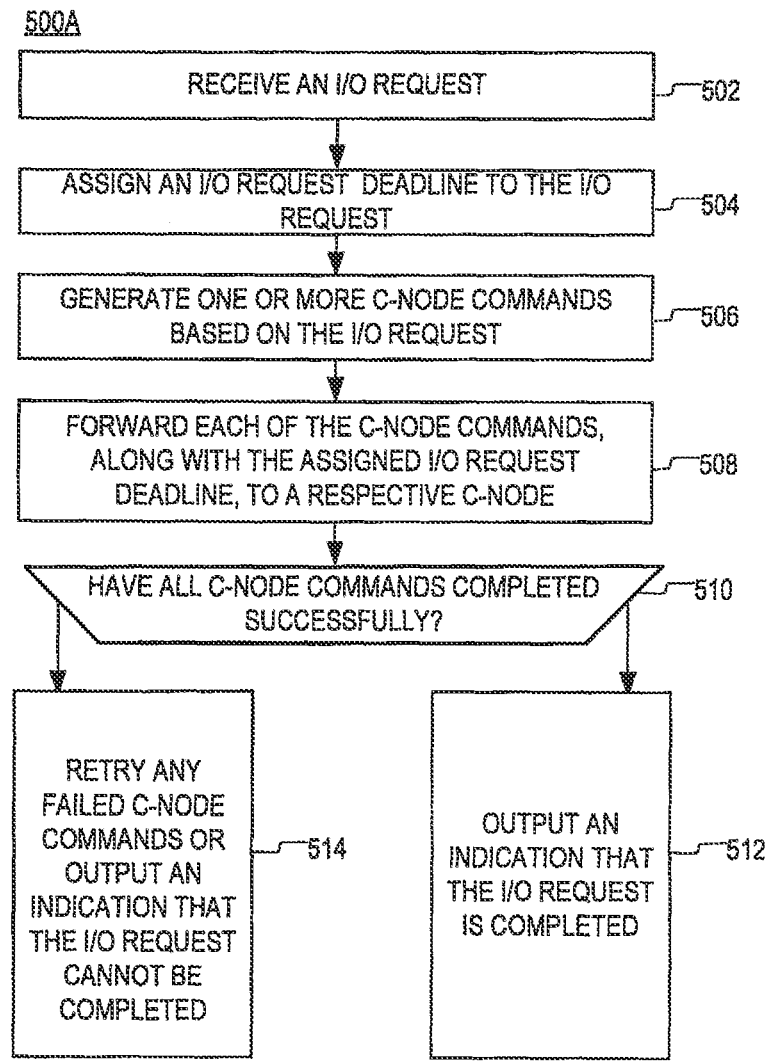
FIG. 5A is a flowchart of an example of a process, according to aspects of the disclosure.

FIG. 5A is a flowchart of an example of a process 500A, according to aspects of the disclosure. According to the present example, the process 500A is performed by an R-node 402 of the source system 210. However, it will be understood that the present disclosure is not limited to any specific implementation of the process 500A.

At step 502, the R-node 402 receives an I/O request. At step 504, the R-node assigns a deadline to the I/O request. In some implementations, the deadline may include any suitable number, string, or alphanumerical string which, at least in part, indicates a time by which the I/O request has to be completed. At step 506, the R-node 402 generates one or more C-node commands based on the I/O request. At step 508, the R-node 402 transmits each of the C-node commands to a respective C-node 404 along with the I/O request deadline. The I/O request deadline may be embedded in each of the C-node commands or transmitted separately.

At step 510, the R-node 402 determines if all of the C-node commands have been completed successfully. If all commands have been completed successfully, the process 500A proceeds to step 512. Otherwise, if any of C-node commands have failed, the process 500A proceeds to step 514. At step 512, the R-node 402 outputs an indication that the I/O request has been completed successfully. In some implementations, the indication may be transmitted to a host device 130 (which is the originator of the I/O request). At step 514, the R-node 402 either retries any failed C-node commands or outputs an indication that the I/O request cannot be completed successfully. In some implementations, the indication may be transmitted to a host device 130 (which is the originator of the I/O request).

Figure 5B:
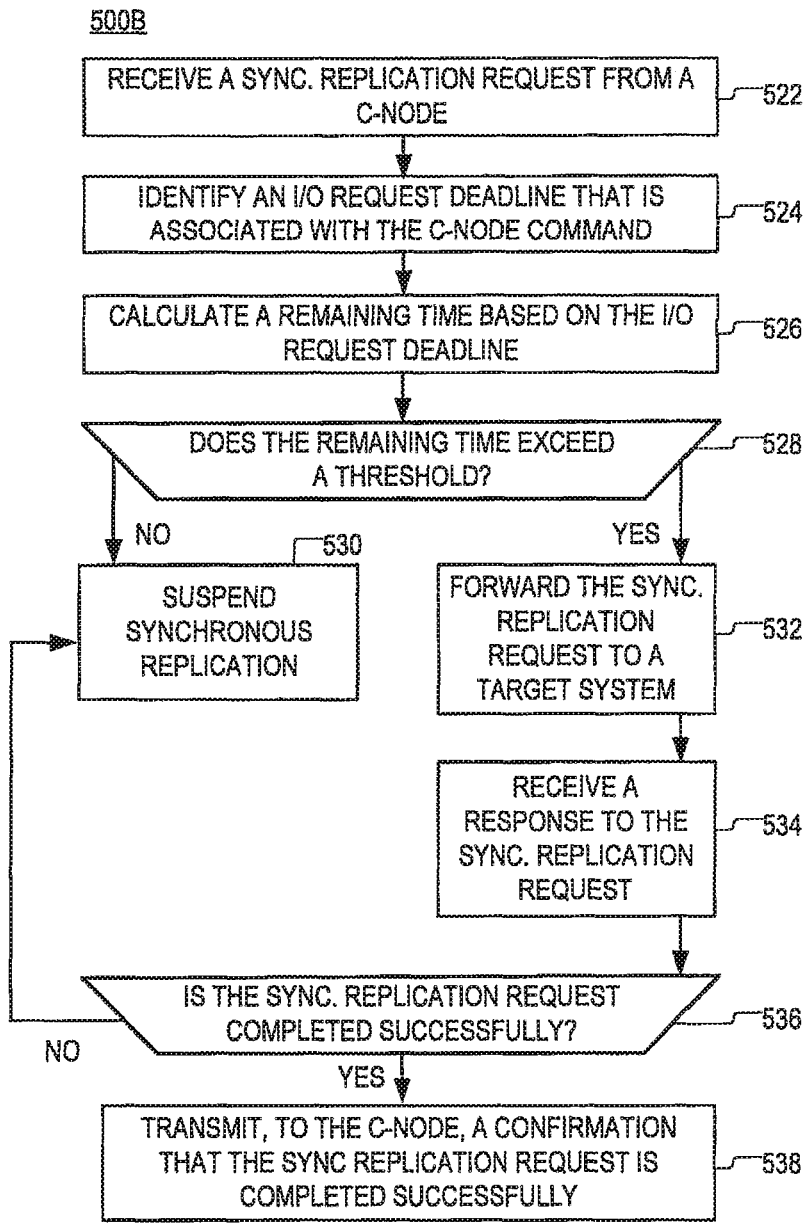
FIG. 5B is a flowchart of an example of a process, according to aspects of the disclosure.

FIG. 5B is a flowchart of an example of a process 500B for processing replication requests that are received at an R-node 402 of the source system 210.

At step 522, the R-node 402 receives a synchronous replication request that is transmitted by one of the C-nodes 404 (hereinafter "sender C-node 404"). The synchronous replication request may be associated with a C-node command that is received at the sender C-node 404 from another R-node 402. The C-node command may be associated with a respective I/O request and a respective I/O request deadline, as discussed above with respect to FIG. 5A.

At step 524, the R-node 402 identifies an I/O request deadline that is associated with the synchronous replication request. The I/O request deadline may be the same or similar to the I/O assigned at step 504. In some implementations, the I/O request deadline may be embedded in the synchronous replication request. In such implementations, identifying the I/O request deadline may include extracting the I/O request deadline from the synchronous replication request.

At step 526, the R-node 402 calculates a remaining time associated with the synchronous replication request. In some implementations, the remaining time may be the duration of the time period starting at a current time instant (e.g., time instant when step 526 is performed) and ending at the I/O request deadline. In some implementations, the remaining time may be calculated by subtracting the current time from the I/O request deadline (e.g., remaining time=I/O request deadline—current time).

At step 528, a determination is made if the remaining time exceeds a threshold. If the remaining time exceeds the threshold, the process 500B proceeds to step 532. Otherwise, the process 500B proceeds to step 530.

At step 530, the R-node 402 causes the storage system 110 to stop performing synchronous replication. Additionally or alternatively, in some implementations, When the R-node 402 causes the storage system 110 to stop performing synchronous replication, the R-node 402 may cause the storage system 110 to begin performing asynchronous replication. Causing the system to begin performing asynchronous replication would ensure that the data associated with the synchronous replication request would be copied to the target system 250 at a later time (e.g., when an RPO is reached).

At step 532, the R-node 402 transmits the synchronous replication request to the target system 250 (e.g, to a node in the target system 250) along with the I/O request deadline. In some implementations, the synchronous replication request and the I/O request deadline may be transmitted over the network 280. As noted above, the I/O request deadline may be embedded in the synchronous replication request or provided separately. In some implementations, before forwarding the synchronous replication request to a node in the target system 250, the R-node 402 may embed a source timestamp in the synchronous replication request. In some implementations, the source timestamp may identify a time when the synchronous replication request is received at the R-node 402 (or transmitted by the R-node 402).

At step 534, the R-node 402 receives a response to the synchronous replication request from the target system node. At step 536, the R-node 402 detects whether the synchronous replication request has been completed successfully. If the synchronous replication request has been completed successfully, the process 500B proceeds to step 538. Otherwise, if the synchronous replication request has not been completed successfully, the process 500B returns to step 530. At step 538, the R-node 402 updates a record, stored in the memory of the R-node 402, to indicate that the synchronous replication request has been completed successfully.

Figure 6:
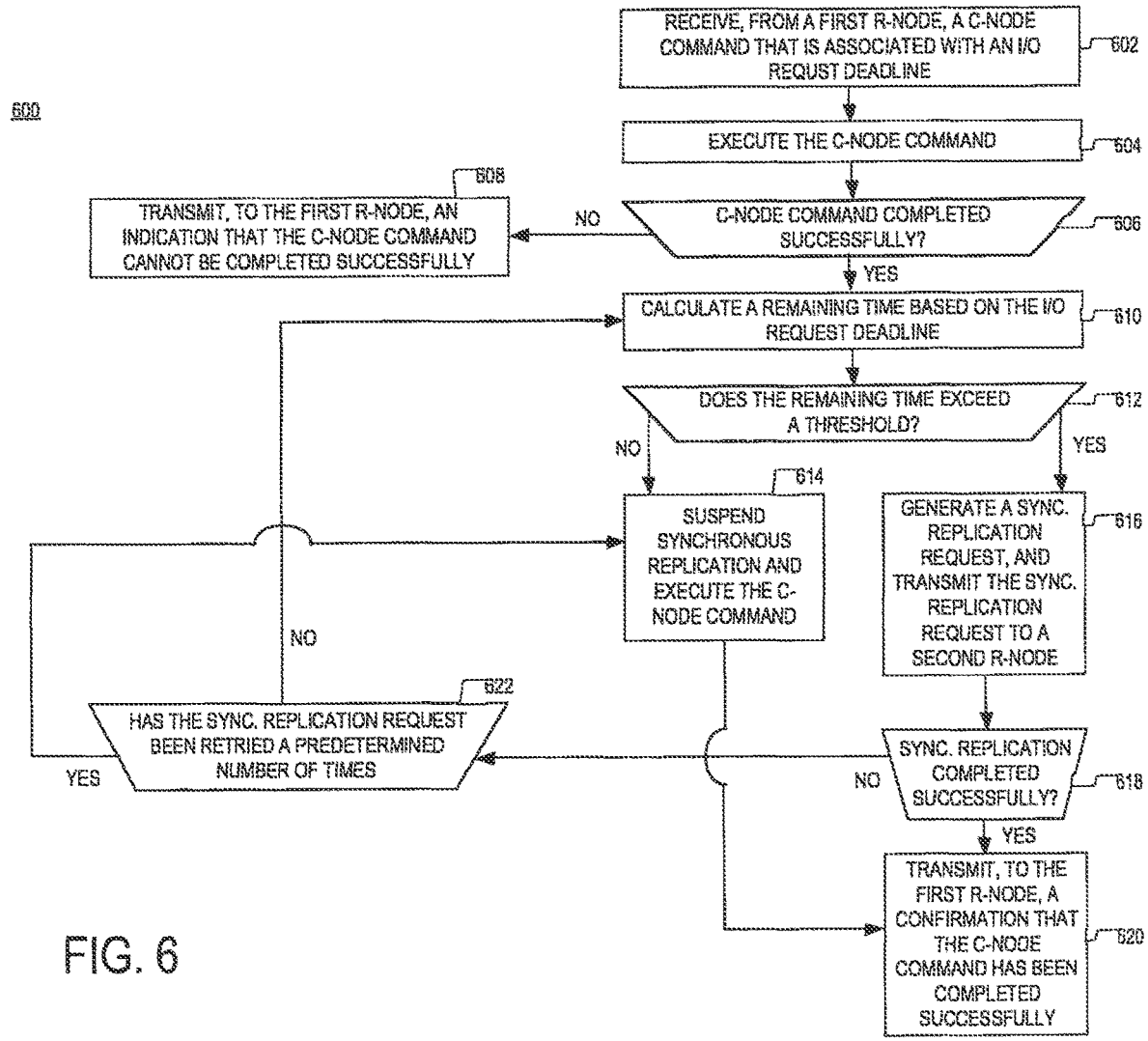
FIG. 6 is a flowchart of an example of a process, according to aspects of the disclosure.

FIG. 6 is a flowchart of an example of a process 600, according to aspects of the disclosure. According to the present example, the process 600 is performed by a C-node 404 of the source system 210. However, it will be understood that the present disclosure is not limited to any specific implementation of the process 600. In this regard, it will be understood that at least some of the steps in the process 600 can be performed by another component of the storage system I/O.

At step 602, the C-node 404 receives a C-node command along with an I/O request deadline. The C-node command is received from a first R-node 402. The C-node command is received while the storage system 110 is in a state in which it performs synchronous replication. The C-node command may be the same or similar to any of the C-node commands transmitted at step 508. In some implementations, the I/O request deadline may be embedded in the C-node command. Additionally or alternatively, in some implementations, the I/O request deadline may be provided separately from the C-node command.

At step 604, the C-node executes the C-node command locally. In some implementations, executing the C-node command may include issuing one or more write requests (or another type of instructions) to the storage device(s) 340.

At step 606, a determination is made if the C-node command has been completed successfully. If the C-node command has been executed successfully, the process 600 proceeds to step 610. Otherwise, if the C-node command could not be executed successfully (e.g., after a predetermined number of retries, etc.), the process 600 proceeds to step 608.

At step 608, the C-node 404 may transmit to the first R-node 402, an indication that the C-node command cannot be completed.

At step 610, the C-node 404 calculates a remaining time associated with the C-node command. In some implementations, the remaining time may be the duration of the time period starting at a current time instant (e.g., time instant when step 604 is performed) and ending at the I/O request deadline. In some implementations, the remaining time may be calculated by subtracting the current time from the deadline (e.g., remaining time=deadline−current time).

At step 612, a determination is made if the remaining time exceeds a threshold. If the remaining time exceeds the threshold, the process 600 proceeds to step 616. Otherwise, if the remaining time does not exceed the threshold, the process 600 proceeds to step 614.

At step 614, the C-node 404 causes the storage system 110 to stop performing synchronous replication, after which the process 600 proceeds to step 620.

At step 616, the C-node 404 generates a synchronous replication request and transmits the synchronous replication request to a second R-node. The synchronous replication request may he based on the C-node command. In some implementations, the synchronous replication request may include at least some of the payload of the C-node command and/or other replication data that is generated based on the payload. In some implementations, generating the synchronous replication request may include embedding the I/O request deadline into the synchronous replication request. In some implementations, the synchronous replication request may be the same or similar to the synchronous replication request that is discussed above with respect to FIG. 5B, The second R-node may be the same or different from the first R-node. According to the present example, the second R-node 402 is a node that is executed in a different process than the first R-node 402 and/or a different storage server 220.

At step 618, the C-node 404 determines whether the synchronous replication is completed successfully. in some implementations, the determination can be made based on a message that is received from the second R-node 402, which indicates whether the synchronous replication request has been completed successfully. If the synchronous replication request has been completed successfully, the process 600 proceeds to step 620. Otherwise, the process 600 proceeds to step 622.

Figure 7:
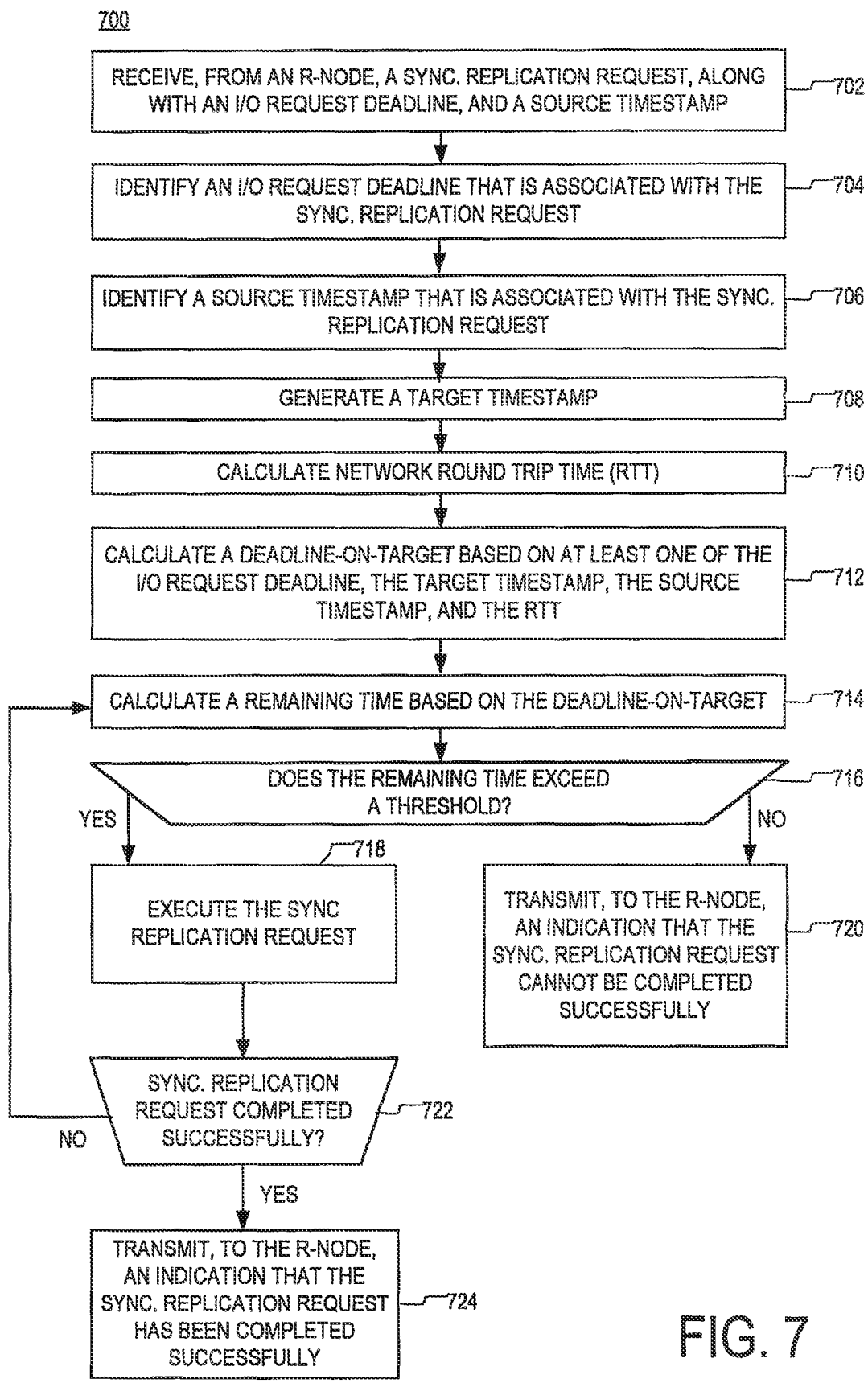
FIG. 7 is a flowchart of an example of a process, according to aspects of the disclosure.

At step 620, the C-node 404 the C transmits, to the first R-node 402, an indication that the C-node command has been completed successfully, At step 622, the C-node 404 determines if the synchronous replication request has already been re-tried a predetermined number of times. If the synchronous replication request has not been retried a predetermined number of times, the process 600 returns to step 610, and the synchronous replication request is executed again. Otherwise, if the maximum number of retries for the synchronous replication request is reached, the process 600 proceeds to step 622. Although in the example of FIG. 6 the process 600 first detects whether a maximum number of retries has been reached, and then determines whether there is sufficient remaining time to attempt the synchronous replication request, alternative implementations are possible, in which the process 600 does not take into account whether a maximum number of retries has been reached. In such implementations, the process 600 may attempt to execute the synchronous replication request for as long as there is available time. Additionally or alternatively, in some implementations, the process 600 may attempt to execute the synchronous replication request at most a predetermined number of times, provided that there is available time, FIG. 7 is a flowchart of an example of a process 700, according to aspects of the disclosure. According to the present example, the process 700 is performed by a node of the target system 250 (hereinafter "target system node"). The node may include an R-node, a C-node, and/or any other suitable type of node.

At step 702, the target system node receives a synchronous replication request. The synchronous replication request may be the same or similar to the synchronous replication request transmitted at step 532 of the process 500B. The synchronous replication request may be received from an R-node 402 in, At step 704, the target system node identifies an I/O request deadline that is associated with the synchronous replication request. In some implementations, the I/O request deadline may be the same or similar to the deadline that is assigned at step 504. As noted above, the I/O request deadline may be embedded in the synchronous replication request or provided separately from the synchronous replication request.

At step 706, the target system node identifies a source timestamp that is associated with the synchronous replication request. In some implementations, the source timestamp may be the same or similar to the source timestamp discussed above with respect to step 532.

At step 708, the target system node generates a target timestamp. In some implementations, the target timestamp may identify a time when the synchronous replication request is received at the target system 250 and/or time when processing of the synchronous replication request is commenced, At step 710, the target system node calculates a round trip time (RTT) of network 280, At step 712, the target system node calculates a deadline-on-target based on the I/O request deadline, the target timestamp, the source timestamp, and the RTT of network

280. In some implementations, the deadline on target time may be calculated using Equation 1:

$$\text{deadline-on-target} = io\_request\_deadline - (source\_timestamp - target\_timestamp) - RIT \quad (\text{Eq. 1})$$

As can be readily appreciated, the deadline-on-target is calculated by discounting the I/O request deadline, As noted above, the deadline-on-target is calculated based on: (i) the RTT of network 280, and (ii) the difference between the source and target timestamps. Although in the present example, the deadline-on-target is calculated based on both the RTT of network 280 and the difference between the source and target timestamps, alternative implementations are possible in which the deadline-on-target is calculated based on one or the other (e.g., based on only one of the RTT of network 280 and the difference between the source and target timestamps).

As can be readily appreciated, the deadline-on-target is calculated by discounting the I/O request deadline to compensate for external factors that further limit the amount of time which the target system 250 has to complete the replication request, Taking the RTT of network 280 into consideration when calculating the deadline-on-target accounts for any delay that would be incurred by the synchronous replication request as a result of the condition of network 280 (e.g., delay resulting from an acknowledgment not being delivered on time by the network 280). Furthermore, since the source system 210 and the target system 250 are different storage systems, they may have some clock deviation, which can result in the target system 250 detecting that it has more time to complete a synchronous replication request than what is actually available. In this regard, taking into account the difference between the source and target timestamps may help the target system node to determine the actual time budget that is available to it for completing the replication request, irrespective of any such clock deviation.

At step 714, the target system node calculates a remaining time associated with the synchronous replication request. In some implementations, the remaining time may be the duration of the time period starting at a current time instant (e,g, time instant when step 604 is performed) and ending at the deadline-on-target. In some implementations, the remaining time may be calculated by subtracting the current time from the deadline-on-target (e.g., remaining time=deadline-on-target−current time).

At step 716, a determination is made if the remaining time exceeds a threshold. If the remaining time exceeds the threshold, the process 700 proceeds to step 718. Otherwise, if the remaining time does not exceed the threshold, the process 700 proceeds to step 720.

At step 718, the target system node executes the synchronous replication request. In some implementations, executing the synchronous replication request may include decomposing the synchronous replication request into subcommands and transmitting the subcommands to other nodes in the target system for further execution. Additionally or alternatively, in some implementations, executing the synchronous replication request may include issuing one or more commands to storage devices that are part of the target system 250.

At step 720, the target system node declines the synchronous replication request. In some implementations, declining the synchronous replication request may include transmitting to the R-node 402, which is the sender of the synchronous replication request, an indication that the synchronous replication request cannot be completed successfully.

At step 722, the target system node determines whether the synchronous replication request was executed successfully. In some implementations, the determination may be based on whether messages (e.g., signals) are received at the target system node (within a timeout period), which indicate that any subcommands/commands issued at step 718 have been completed successfully. If the synchronous replication request was executed successfully, the process 700 proceeds to step 724. Otherwise, if the attempt was unsuccessful, the process 700 returns to step 714, and the synchronous replication requests is executed again, provided that there is sufficient time.

At step 724, the target system node transmits to the R-node 402 (which is the sender of the replication request) an indication that the replication request has been executed successfully.

For the purposes of the present disclosure, the terms "process" and "thread" may be used interchangeably to refer to a sequence of processor-executable instructions that can be managed independently by a scheduler that is part of an operating system and/or another type of scheduler that is itself managed by the operating system scheduler.

Those of ordinary skill in the art would readily recognize how to transition a storage system from a first state in which the storage system performs synchronous replication to a second state in which the storage system does not perform synchronous replication (e.g., a state in which the storage system performs asynchronous replication instead). In some implementations, a C-node 404 may cause the storage system 110 to stop performing synchronous replication by transmitting an instruction to the management system (e.g., not shown), which when received by the management system would cause the management system to reconfigure one or more components of the storage system 110 to stop performing synchronous replication. Further information about the manner in which a storage system can be stopped from performing synchronous replication can be found in U.S. patent application Ser. No. 15/872,553, titled STORAGE SYSTEM WITH CONSISTENT TERMINATION OF DATA REPLICATION ACROSS MULTIPLE DISTRIBUTED PROCESSING MODULES, which is herein incorporated by reference in its entirety.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances, In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

As used throughout the disclosure, the term "storage system" may refer to one or more of: (i) a distributed storage system including a source system and a target system, (ii) the target system, or (iii) the source system.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a storage system, the method comprising:
   receiving an I/O request at an R-node;
   assigning, by the R-node, a deadline to the I/O request, the deadline being a time by which the I/O request is required to be completed;
   generating, by the R-node request, a C-node command based on the I/O request and including a first indication of the deadline in the C-node command, the C-node command being generated as a result of the R-node decomposing the I/O request into a plurality of C-node commands;
   transmitting the C-node command from the R-node to a C-node;
   calculating, by the C-node, a first remaining time based on the first indication of the deadline, the first remaining time being a duration of a time period starting at a current time instant and ending at the deadline;
   detecting, by the C-node, whether the first remaining time exceeds a first threshold;
   when the first remaining time exceeds the first threshold, executing the C-node command and transmitting, from the C-node to the R-node, a synchronous replication request that is associated with the C-node command, the synchronous replication request including a second indication of the deadline; and
   when the first remaining time does not exceed the first threshold, causing the storage system to stop performing synchronous replication and executing the C-node command.

2. The method of claim 1, wherein causing the storage system to stop performing synchronous replication includes transmitting a signal, which, when received by a management system, causes the management system to instruct a plurality of C-nodes in the storage system to stop performing synchronous replication.

3. The method of claim 1, further comprising:
receiving the synchronous replication request at the R-node;
extracting the second indication of the deadline from the synchronous replication request;
calculating, by the R-node, a second remaining time based on the second indication of the deadline;
detecting, by the R-node, whether the second remaining time exceeds a second threshold;
when the second remaining time does not exceed the second threshold, causing the storage system to stop performing synchronous replication; and
when the second remaining time exceeds the second threshold, forwarding the synchronous replication request to a target system.

4. The method of claim 3, wherein the storage system includes a content-addressable storage system.

5. The method of claim 3, wherein the R-node is part of a source system, and the synchronous replication request is forwarded to the target system together with the deadline, the method further comprising:
detecting a round trip time (RTT) of a network that is used at least in part to connect the source system to the target system;
calculating, by a node in the target system, a deadline-on-target based on the deadline and the RTT;
calculating a third remaining time based on the deadline-on-target;
detecting, by the node in the target system, whether the third remaining time exceeds a third threshold;
when the third remaining time exceeds the third threshold, executing the synchronous replication request; and
when the third remaining time does not exceed the third threshold, declining the synchronous replication request.

6. A device, comprising:
a memory; and
at least one processor operatively coupled to the memory, the at least one processor being configured to execute a C-node and an R-node of a storage system:
wherein the R-node is configured to receive an I/O request, a deadline to the I/O request, the deadline being a time by which the I/O request is required to be completed, generate a C-node command based on the I/O request, the C-node command being generated as a result of the R-node decomposing the I/O request into a plurality of C-node commands, include a first indication of the deadline in the C-node command, and transmit the C-node command to the C-node;
wherein the C-node is configured to: (i) calculate a first remaining time based on the first indication of the deadline, the first remaining time being a duration of a time period starting at a current time instant and ending at the deadline, (ii) detect whether the first remaining time exceeds a first threshold, (iii) in response to detecting that the first remaining time exceeds the first threshold, execute the C-node command and transmit, to the R-node, and (iv) in response to detecting that the first remaining time does not exceed the first threshold, cause the storage system to stop performing synchronous replication and execute the C-node command.

7. The device of claim 6, wherein causing the storage system to stop performing synchronous replication includes transmitting a signal, which, when received by a management system, causes the management system to instruct a plurality of C-nodes in the storage system to stop performing synchronous replication.

8. The device of claim 2, wherein the synchronous replication request includes a second indication of the deadline and the R-node is further configured to:
receive the synchronous replication request;
extract the second indication of the deadline from the synchronous replication request;
calculate a second remaining time based on the second indication of the deadline;
detect whether the second remaining time exceeds a second threshold;
when the second remaining time does not exceed the second threshold, cause the storage system to stop performing synchronous replication; and
when the second remaining time exceeds the second threshold, forward the synchronous replication request to a target system.

9. The device of claim 6, wherein the storage system includes a content-addressable storage system.

10. A non-transitory computer-readable storage medium storing processor-executable instructions, which when executed by one or more processors in a storage system, cause the one or more processors to perform the operations of:
receiving an I/O request at an R-node;
assigning, by the R-node, a deadline to the I/O request, the deadline being a time by which the I/O request is required to be completed;
generating, by the R-node, a C-node command based on the I/O request and including a first indication of the deadline in the C-node command, the C-node command being generated as a result of the R-node decomposing the I/O request into a plurality of C-node commands;
transmitting the C-node command and the I/O request from the R-node to a C-node;
calculating, by the C-node, a first remaining time based on the first indication of the deadline, the first remaining time being a duration of a time period starting at a current time instant and ending at the deadline;
detecting, by the C-node, whether the first remaining time exceeds a first threshold;
when the first remaining time exceeds the first threshold, executing the C-node command and transmitting, from the C-node to the R-node, a synchronous replication request that is associated with the C-node command, the synchronous replication request including a second indication of the deadline; and
when the first remaining time does not exceed the first threshold, causing the storage system to stop performing synchronous replication and executing the C-node command.

11. The non-transitory computer-readable storage medium of claim 10, wherein causing the storage system to stop performing synchronous replication includes transmitting a signal, which, when received by a management system, causes the management system to instruct a plurality of C-nodes in the storage system to stop performing synchronous replication.

12. The non-transitory computer-readable storage medium of claim 10, wherein the processor-executable instructions, when executed by the one or more processors, further cause the one or more processors to perform the operations of:

receiving the synchronous replication request at the R-node;

extracting the second indication of the deadline from the synchronous replication request;

calculating, by the R-node, a second remaining time based on the second indication of the deadline;

detecting, by the R-node, whether the second remaining time exceeds a second threshold;

when the second remaining time does not exceed the second threshold, causing the storage system to stop performing synchronous replication; and when the second remaining time exceeds the second threshold, forwarding the synchronous replication request to a target system.

13. The non-transitory computer-readable storage medium of claim 12, wherein the R-node is part of a source system, the synchronous replication request is forwarded to the target system together with the deadline, and the processor-executable instructions, when executed by the one or more processors, further cause the one or more processors to perform the operations of:

detecting a round trip time (RTT) of a network that is used at least in part to connect the source system to the target system;

calculating, by a node in the target system, a deadline-on-target based on the deadline and the RTT;

calculating a third remaining time based on the deadline-on-target;

detecting, by the node in the target system, whether the third remaining time exceeds a third threshold;

when the third remaining time exceeds the third threshold, executing the synchronous replication request; and when the third remaining time does not exceed the third threshold, declining the synchronous replication request.

14. The non-transitory computer-readable storage medium of claim 10, wherein the storage system includes a content-addressable storage system.

* * * * *